US008332893B2

(12) United States Patent
Dhodapkar et al.

(10) Patent No.: US 8,332,893 B2
(45) Date of Patent: Dec. 11, 2012

(54) HYBRID CHANNEL MAP

(75) Inventors: Amit A. Dhodapkar, Cupertino, CA (US); Shannon Vosseller, San Francisco, CA (US); David Alexander Collacott, Sunnyvale, CA (US); Juan G. Mendez Fernandez, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 11/974,726

(22) Filed: Oct. 16, 2007

(65) Prior Publication Data

US 2009/0097530 A1 Apr. 16, 2009

(51) Int. Cl.
*G06F 3/00* (2006.01)
*G06F 13/00* (2006.01)
*H04N 5/445* (2006.01)

(52) U.S. Cl. .......................................... 725/49; 725/48

(58) Field of Classification Search .................... 725/37, 725/38, 39, 44, 48, 49, 59
See application file for complete search history.

(56) References Cited

U.S. PATENT DOCUMENTS

| | | | | |
|---|---|---|---|---|
| 5,638,112 | A | 6/1997 | Bestler et al. | |
| 5,883,677 | A * | 3/1999 | Hofmann | 348/584 |
| 5,923,362 | A * | 7/1999 | Klosterman | 725/48 |
| 6,442,757 | B1 | 8/2002 | Hancock et al. | |
| 6,507,951 | B1 | 1/2003 | Wugofski | |
| 6,742,183 | B1 | 5/2004 | Reynolds et al. | |
| 7,027,716 | B1 | 4/2006 | Boyle et al. | |
| 7,047,549 | B2 * | 5/2006 | Schein et al. | 725/43 |
| 7,100,186 | B1 * | 8/2006 | Minakawa et al. | 725/59 |
| 7,130,576 | B1 | 10/2006 | Gurantz et al. | |
| 7,644,428 | B2 * | 1/2010 | Akiyama | 725/49 |
| 2002/0124071 | A1 | 9/2002 | Proehl et al. | |
| 2003/0088870 | A1 | 5/2003 | Wang | |
| 2005/0086693 | A1 | 4/2005 | Shintani | |
| 2007/0099654 | A1 * | 5/2007 | Schadenko | 455/553.1 |

OTHER PUBLICATIONS

"Data Management in Set-Top Box Electronic Programming Guides", Date: 2002, McObject LLC, Issaquah, WA.

Sul, et al., "A Hybrid Pagoda Broadcasting Protocol: Fixed-Delay Pagoda Broadcasting Protocol with Partial Preloading", Date: Jul. 6-9, 2003, vol. 1, pp. I-801-I-804.

* cited by examiner

*Primary Examiner* — John Schnurr

(74) *Attorney, Agent, or Firm* — Wolfe-SBMC

(57) ABSTRACT

A hybrid channel map is described. In an implementation, a client obtains a plurality of channel maps, each from a respective one of a plurality of content providers that are configured to provide content via channels to the client. A hybrid channel map is formed from the plurality of channel maps.

20 Claims, 4 Drawing Sheets

HYBRID CHANNEL MAP

BACKGROUND

Users are continually exposed to an ever increasing variety of sources for content. For example, a user may obtain television programming wirelessly from an "over the air" broadcast, from a cable service, via a satellite connection, using an Internet connection, and so on. In addition, the user may have access to multiple sources of content at any one particular time, such as through the "over the air" broadcast as well as a cable connection.

Previous techniques that were used to interact with these different sources, however, were often burdensome. For example, a user may access satellite television programming using a particular input on a television, such as to watch a movie or other subscription-based television programming. The user may also wish to access one or more local channels that are not available from the satellite television programming, such as to watch the local news and weather available via an "over the air" broadcast. In order to interact with the "over the air" broadcast, however, the user may be forced to manually switch from the input used to access the satellite programming to an input serviced by an antenna to receive the broadcast. Therefore, to engage in traditional channel surfing, the user may be forced to manually switch between inputs, which may be frustrating and counter to the surfing experience. Additionally, a user may find it difficult to determine which source should be used to access particular content, such as to watch a sporting event that may be but is not guaranteed to be available from either the over the air broadcast or the satellite television programming.

SUMMARY

A hybrid channel map is described. In an implementation, a client obtains a plurality of channel maps, each from a respective one of a plurality of content providers that are configured to provide content via channels to the client. A hybrid channel map is formed from the plurality of channel maps.

In another implementation, a client includes one or more modules to output content from a plurality of content providers via a plurality of channels. The one or more modules are also configured to form a hybrid channel map from a plurality of channel maps obtained from the plurality of content providers such that a particular channel map from a particular said content provider is given priority in the hybrid channel map to retain one or more original channel numbers over another channel map from another content provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Hybrid channel maps are described. As previously described, users are often able to access content from a variety of sources and may even do so at a same location, such as television content from an "over the air" broadcast, from a cable service, via a satellite connection, using an Internet connection, and so on.

One device that has been developed to enable a user to access content from multiple sources is commonly referred to as a "hybrid" set-top which is designed to access content using at least two techniques, such as satellite and cable. Other devices may also access content from multiple sources, such as a traditional television having a plurality of inputs. For example, each of the inputs "at the back" of the television may be used to access a different source of content.

Each of the sources, however, is typically configured to act as a "stand alone" source. For example, the satellite TV provider may use a channel map that assigns channel numbers to particular content much like a traditional television broadcast. Likewise, the television broadcaster may also assign content to particular channels. Therefore, the television broadcaster and the satellite TV provider may use different channel numbering for matching content, content may be available from one source that is not available from the other source, and so on. Consequently, user's typically interacted with each source separately, such as to switch from an "over the air" broadcast to access local channels to a satellite TV provider to access "expanded" content, e.g., movies, pay-per-view, subscription based content, and so on.

Accordingly, hybrid channel mapping techniques are described. In one or more implementations, a hybrid channel map is formed from a plurality of channel maps, each being provided by a respective content provider. The hybrid channel map is formed such that the user may access content via channels from each of the plurality of content providers. Further, these techniques may be employed to resolve conflicts in channel maps (e.g., use of a matching channel for different content), may be used to assign priority to a channel map from a particular content provider, may incorporate override properties of a content provider to influence formation of the hybrid channel map, and so on, further discussion of which may be found in the following sections.

In the following discussion, an exemplary environment is first described which is operable to perform hybrid channel mapping techniques. Exemplary procedures are then described which may be employed in the exemplary environment, as well as in other environments without departing from the spirit and scope thereof.

Exemplary Environment

Figure 1:
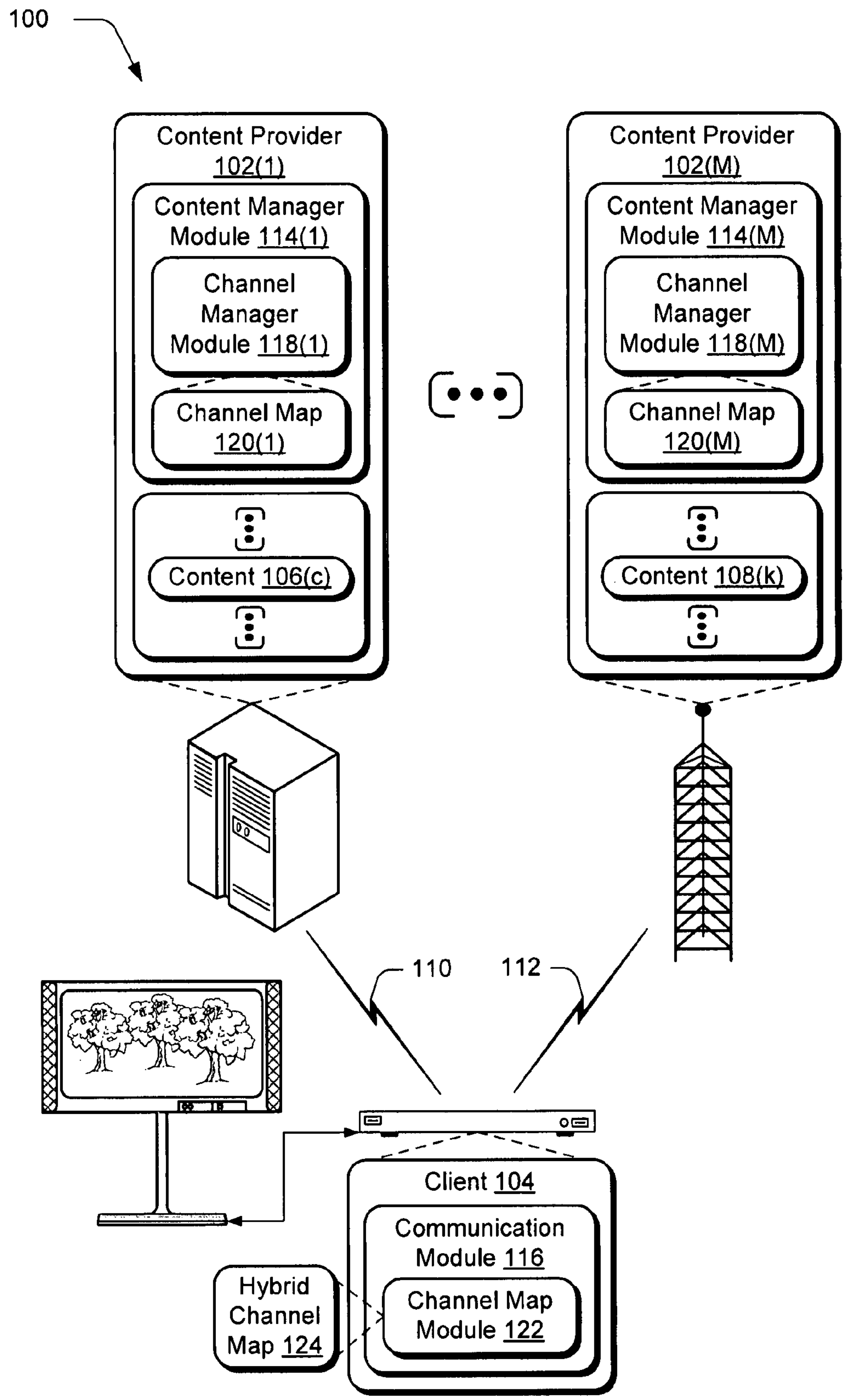
FIG. 1 is an illustration of an environment in an exemplary implementation that is operable to employ hybrid channel mapping techniques.

FIG. 1 is an illustration of an environment 100 in an exemplary implementation that is operable to employ hybrid channel mapping techniques. The illustrated environment 100 includes a plurality of content providers 102(1)-102(M) and a client 104. The client 104 may be configured in a variety of ways to receive content 106(*c*), 108(*k*) (where "c" and "k" can be any integer from one to "C" and "K", respectively) from respective content providers 102(1)-102(M).

The client 104, for example, may be configured as a computer that is capable of communicating over network connections 110, 112 to the respective content provider 102(1)-102(M), such as a desktop computer, a mobile station, an entertainment appliance, a set-top box communicatively coupled to a display device as illustrated, a wireless phone, a game console, and so forth. Thus, the client 104 may range from a full resource device with substantial memory and processor resources (e.g., personal computers, game consoles) to a low-resource device with limited memory and/or processing resources (e.g., traditional set-top boxes, handheld game consoles, wireless phones). The client 104, for purposes of the following discussion, may also relate to a person and/or entity that operate the client. In other words, the client 104 may describe a logical client that includes a user, software and/or a device.

The network connections 110, 112 may be implemented by a wide variety of networks. For example, the networks may include a wide area network (WAN), a local area network (LAN), a wireless network, a public telephone network, an intranet, a wireless broadcast network (e.g., as illustrated by the tower), an Internet connecting the illustrated server of content provider 102(1) with the client 104, and so on. Further, although single network connections 110, 112 are shown, the network connections 110, 112 may be implemented by multiple networks.

Each of the content providers 102(1)-102(M) are illustrated as including respective content manager modules 114(1)-114(M) which are representative of functionality to manage respective content 106(*c*), 108(*k*). For example, the content manager modules 114(1)-114(M) may be used to configure respective content 106(*c*), 108(*k*) for streaming (e.g., packetize the content for distribution over the Internet), encryption and/or compress the content into a form that may be "understood" by the client 104, and so on.

The client 104 is illustrated as including a communication module 116 which is representative of functionality of the client 104 to manage content by the client 104. The communication module 116, for instance, may be utilized by the client 104 to decrypt, decompress and process content into a form to be rendered by an output device, such as by the illustrated display device with speakers. A variety of other examples are also contemplated.

The content manager modules 114(1)-114(M) are further illustrated as including channel manager modules 118(1)-118(M), which are representative of functionality to manage provision of respective content 106(*c*), 108(*k*) on respective channels by respective content providers 102(1)-102(M). The channel manager modules 118(1)-118(M), for instance, may be configured to generate and/or maintain a channel map 120(1)-120(M) which defines which content 106(*c*), 108(*k*) is being provided via which channels. For example, the channel map 120(1) may define that content 106(*c*) from ABC is to be provided via channel "2" whereas channel map 120(M) may define that content 108(*k*) from NBC is to be provided via channel "2".

The communication module 116 of the client 104 is illustrated as including a channel map module 122 which is representative of functionality to generate and/or implement a hybrid channel map 124. The channel map module 122, for instance, may generate the hybrid channel map 124 from the channel maps 120(1)-120(M) of the respective content providers 102(1)-102(M) such that at least some content from each of the plurality of content providers 102(1)-102(M) is made available via the hybrid channel map 124.

In an implementation, the hybrid channel map 124 is configured such that a user of the client 104 need not manually change inputs between the content providers 102(1)-102(M) when "surfing" between channels provided by the different content providers 102(1)-102(M). For example, the communication module 116 may transition automatically between content 106(*c*) of content provider 102(1) and content 108(*k*) of content provider 102(M) using the hybrid channel map 124. In a further implementation, the user is not made aware of which content provider is providing respective content to add further "seamlessness" to the navigation (e.g., channel surfing) experience. A variety of techniques to combine channel maps, resolve conflicts in channel maps (e.g., different content on matching channels) and implement override properties of content providers may be found in relation to the following figures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to memory of FIG. 2. The features of the hybrid channel map techniques described below are platform-independent, meaning that the techniques may be implemented on a variety of commercial computing platforms having a variety of processors.

Figure 2:
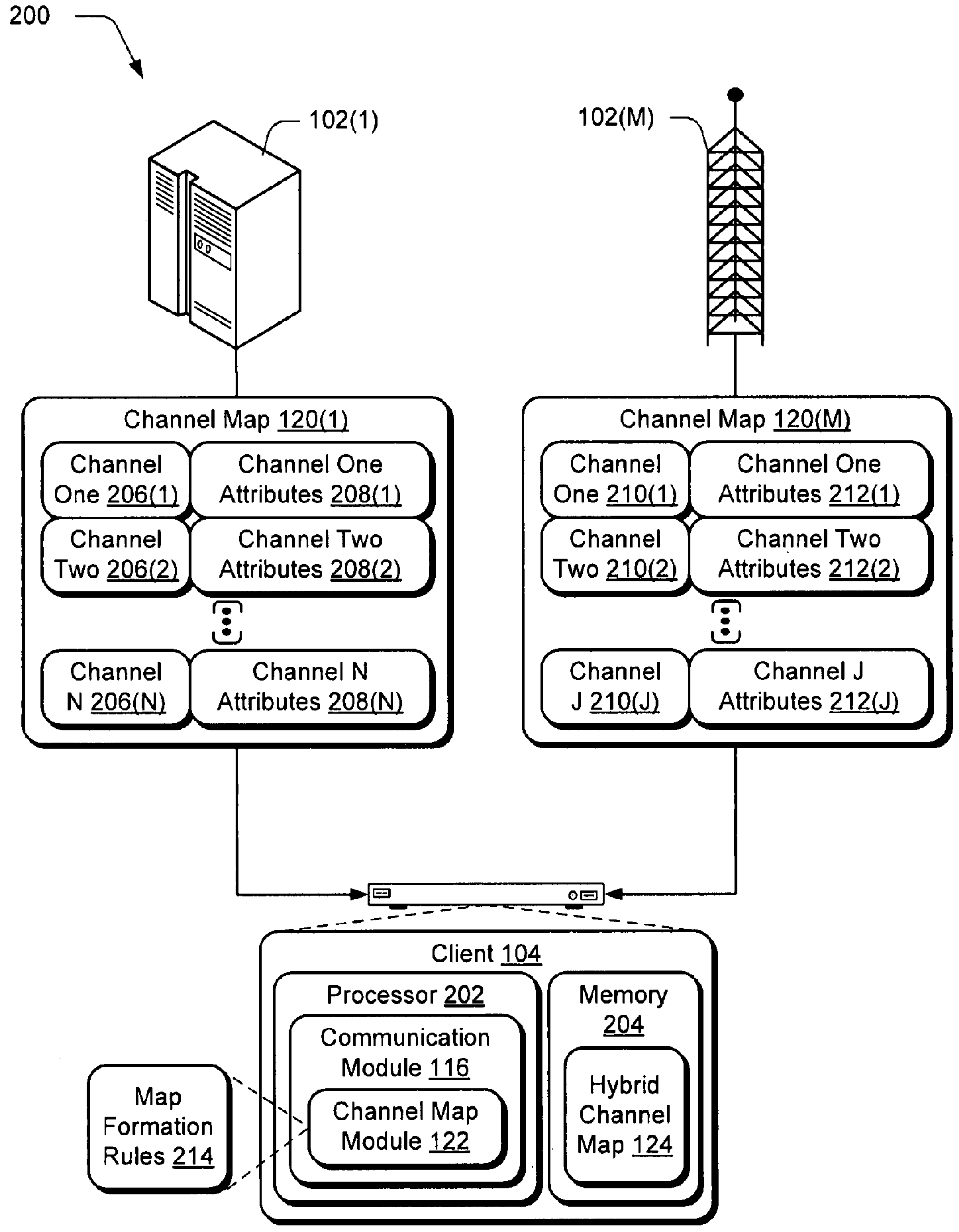
FIG. 2 is an illustration of a system in an exemplary implementation showing a client and channel maps of FIG. 1 in greater detail.

FIG. 2 is an illustration of a system 200 in an exemplary implementation showing the client 104 and channel maps 120(1)-120(M) of FIG. 1 in greater detail. The client 104 of FIG. 2 is illustrated as a client device that includes a processor 202 and memory 204. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204 is shown, a wide variety of types and combinations of memory may be employed, such as random access memory (RAM), hard disk memory, removable medium memory, and other types of computer-readable media.

Channel map 120(1) is illustrated as having a plurality of channels depicted as channel one 106(1), channel two 206(2) and channel N 206(N). Each channel is also depicted as having attributes 208(1)-208(N) that are related to content available via the particular channel, such as a "network" (e.g., CBS, NBC, ABC, ESPN), genre, textual description of content, channel number, and so on. Additionally, the attributes may be identified in a variety of ways. For example, the channel attributes may include a Digital Video Broadcasting (DVB) triplet, which is used to uniquely identify services of each of the channels. Each channel may have a plurality of DVB triplets, use of which is described in greater detail in relation to FIG. 4.

Like channel map 120(1), channel map 120(M) is also illustrated as referencing a plurality of channels illustrated as channel one 210(1), channel two 210(2) and channel J 210(J), each having respective attributes illustrated as channel one attributes 212(1), channel two attributes 212(2) through channel J attributes 212(J). As previously described, the attributes may describe properties associated with content provided via the respective channels.

The channel map module 122 of the client 104 may be executed on the processor 202 to use these attributes to form the hybrid channel map 124. For example, the channel map module 122 may employ map formation rules 214 which define "how" the hybrid channel map 124 is to be generated. The map formation rules 214, for instance, may define which content provider 102(1)-102(M) and consequently which channel map 120(1)-120(M) is to be given priority over other channel maps. Therefore, the designated primary channel may be used as an underlying foundation of the hybrid channel map 124 such that substantially most if not all of the content referenced in the primary channel map is assigned corresponding numbers in the hybrid channel map 124.

One or more other channel maps may then be combined with the primary channel map to form the hybrid channel map 124. This may be performed in a variety of ways. For instance, the channel map module 122 may use the map formation rules 214 to determine "what to do" in the case of a conflict, such as how to reassign channels from subsequent channel maps that conflict with the primary channel map, further discussion of which may be found in relation to FIG. 3.

The channel map module 122 may also take into account a variety of other considerations when forming the hybrid channel map 124. For example, the content providers 102(1)-102(M), through the use of the attributes or other algorithmic techniques, may specify override properties in order to promote and even guarantee that certain content/channel number combinations are maintained in the hybrid channel map. In another example, the map formation rules 214 may include input from a user specifying certain preferred sources for content, e.g., particular content providers or techniques such as an over the air broadcast that may be obtained for less cost than the same content from a subscription based service. In a further example, the hybrid channel map 124 may be formed such that "matching" sources of content are removed to aid navigation between the channels. Therefore, a user may navigate through the hybrid channel map 124 without encountering multiple instances of the same content. A variety of other examples are also contemplated, further discussion of which may be found in relation to the following procedures.

Although the client 104 is illustrated as receiving channel map 120(1) from the content provider 102(1) and channel map 120(M) from content provider 102(M), it should be readily apparent that these channel maps may be obtained in a variety of different ways. For example, the channel map 120(M) from content provider 102(M) may be obtained using different techniques that used to obtain content 108(*k*) from the content provider 102(M), such as via backchannel communication, via a web page, and so on that is different than the wireless broadcast technique utilized to provide content 108(*k*). A variety of different examples are also contemplated.

Exemplary Procedures

The following discussion describes hybrid channel mapping techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
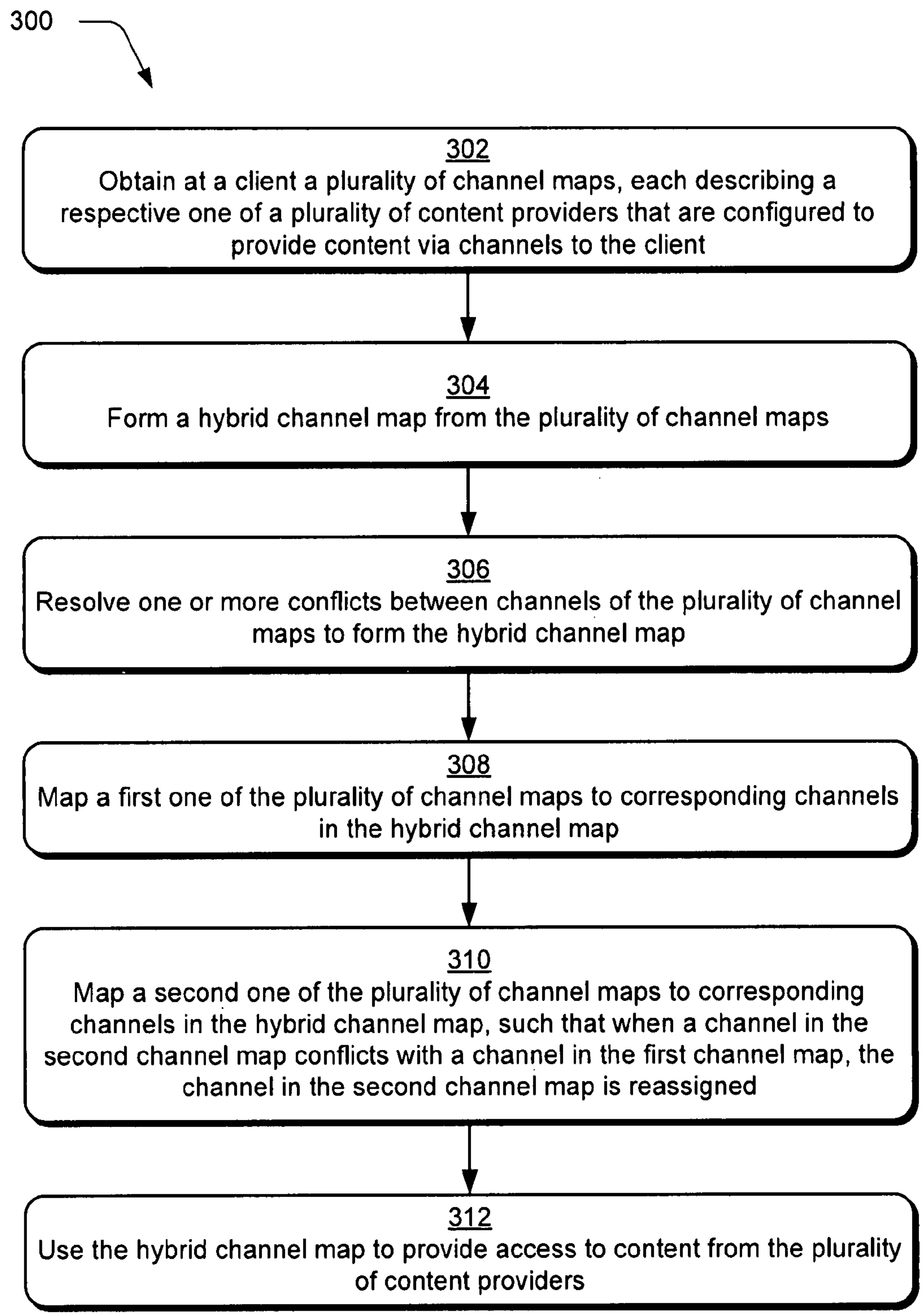
FIG. 3 is a flow diagram depicting a procedure in an exemplary implementation in which a hybrid channel map is formed from a plurality of channel maps at a client.

FIG. 3 depicts a procedure 300 in an exemplary implementation in which a hybrid channel map is formed from a plurality of channel maps at a client. A plurality of channel maps are obtained at a client, each describing a respective one of a plurality of content providers that are configured to provide content via channels to the client (block 302). These channel maps may be obtained in a variety of ways, such as in a transport stream with content, through a dedicated stream that is not used to transport content, by accessing a website, receipt of an email, and so forth.

A hybrid channel map is formed from the plurality of channel maps (block 304). For example, the hybrid channel map may be formed such that content accessible by the client 104 from the plurality of content providers 102(1)-102(M), each having a respective channel map, is available via at least one channel in the hybrid channel map. The hybrid channel map may be formed in a variety of ways.

The channel map module 122 of the client 104, for instance, when forming the hybrid channel map 124 may resolve conflicts between channels of the plurality of channel maps to form the hybrid channel map (block 306). For example, matching channel numbers of the channel maps obtained from the content providers may be used to provide different content, such as channel two in a first channel map be used to provide "NBC" content while channel two in another channel map is used to provide "ABC" content. A variety of techniques may be used to resolve conflicts.

A priority, for instance, may be used such that one of the plurality of channel maps 120(1)-120(M) is given priority over another. For instance, a first one of the plurality of channel maps may be mapped to corresponding channels in a hybrid channel map (block 308) such that the channels in the first channel map "retain" their numbering. A second one of the plurality of channels maps may then be mapped to corresponding channels in the hybrid channel map, such that when a channel in the second channel maps conflicts with a channel in the first channel map, the channel in the second channel map is reassigned (block 310). A variety of reassignment mechanisms may be employed. The conflicting channel in the second channel map may be reassigned to a next available channel (e.g., a next number in a channel sequence that is available). In another example, the conflicting channels may be assigned to a particular range in the hybrid channel map such that these channels may be quickly located by the client 104. In a further example, the channel in the second channel map is reassigned to a channel in the hybrid channel map that is closest to the channel in the first channel map that caused the conflict, e.g., channel two is conflicting but channel one is available in the hybrid channel map, therefore channel two from the second channel map is reassigned to channel one in the hybrid channel map. A variety of other examples are also contemplated, further discussion of which may be found in relation to FIG. 4.

The hybrid channel map may then be used to provide access to content from the plurality of content providers (block 312). The hybrid channel map 124, for instance, may be used by the communication module 116 to determine "how" to present content via channel. This may then be used by the communication module 116 to automatically switch between sources and/or inputs when navigating through channels of the channel map to provide a “seamless” navigation experience, such as when using a “channel up” or “channel down” button without having to use a “source” or “input” button. Likewise, a single electronic program guide may be used to present channels from the hybrid channel map 124 that includes content from a variety of sources. A variety of other examples are also contemplated.

Figure 4:
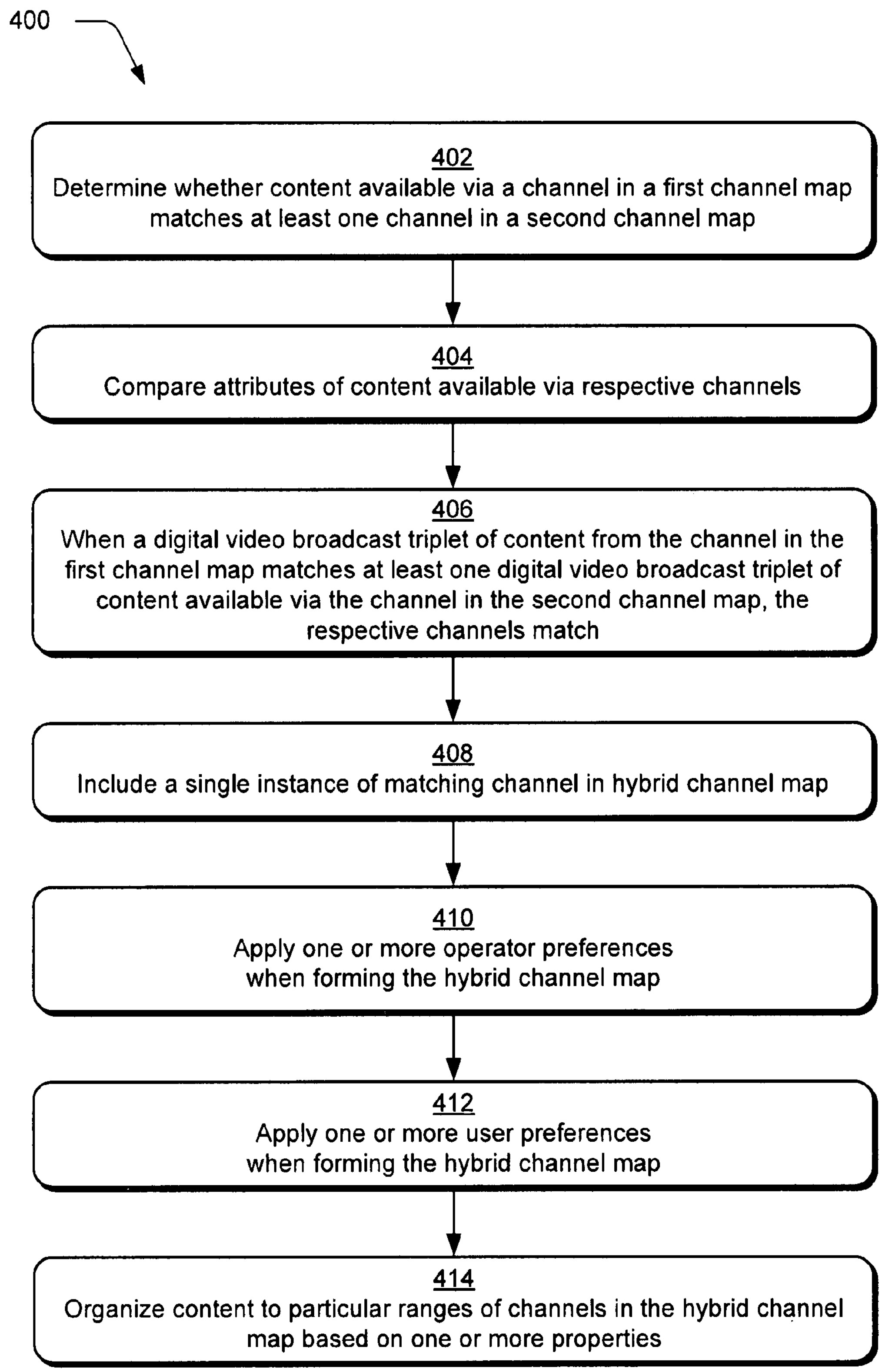
FIG. 4 is a flow diagram depicting a procedure in an exemplary implementation in which a hybrid channel map is formed such that single instances of channels having matching content from different content providers are included in the hybrid channel map.

FIG. 4 depicts a procedure 400 in an exemplary implementation in which the hybrid channel map is formed such that single instances of channels having matching content from different content providers are included in the hybrid channel map. A determination is made as to whether content available via a channel in a first channel map matches at least one channel in a second channel map (block 402). The first channel map, for instance, may detail content that is available from a cable television provider while the second channel map may detail content that is available from an “over the air” broadcast content provider. This determination may be performed in a variety of ways.

For example, attributes of content available via respective channels may be compared (block 404). The attributes may include station identifiers (e.g., “NBC”), textual descriptions of content, one or more Digital Video Broadcast (DVB) “triplets”, and so on. A DVB triplet may be used to identify a service transmitted on a DVB network and may include a network identifier, a transport stream identifier and a service identifier, further description of which may be found in the DVB Specification for Service Information in DVB systems; v1.3.1. Although a few examples have been discussion, it should be readily apparent that a variety of techniques are contemplated which may be used to uniquely identify content available via a particular channel, such as by querying an electronic program guide.

When a Digital Video Broadcast (DVB) triplet of content from the channel in the first channel map matches at least one DVB triplet of content available via the channel in the second channel map, the respective channels match (block 406). Each channel may include multiple DVB triplets to describe multiple services. Therefore, in an implementation should any DVB triplet result in a match, it may be considered that the channels match. A variety of other examples are also contemplated, such as through comparison of textual descriptions and so on as previously described. Further, a wide variety of other considerations may also be taken into account, such as different times that content may be available and so on.

A single instance of matching channel is included in the hybrid channel map (block 408). Thus, as previously described channel surfing may be performed more efficiently by preventing multiple instances of a same channel. In another implementation, however, the matching instances may also be included in the hybrid channel map, such as in a designated range of channel numbers.

One or more operator preferences are applied when forming the hybrid channel map (block 410). In the current example, the blocks are performed at the client 104, which may have access to a variety of different sources of content, e.g., different content providers 102(1)-102(M). Consequently, the client 104 may form different hybrid channel maps when in different deployments. Therefore, in an implementation one of more of the content providers 102(1)-102(M) may influence formation of the hybrid channel map 124.

For example, attributes included in a channel map from the content provider may indicate that certain channel numbers are to be retained, e.g., provided via the same channel number in the hybrid channel map. The content provider may also have an “understanding” of how the hybrid channel map 124 is formed and consequently configure the attributes and other data using algorithmic techniques which increase the likelihood that the content is placed at a desired “location” in the hybrid channel map 124.

One or more user preferences may also be applied when forming the hybrid channel map (block 412). The user, for instance, may specify “free” (e.g., from an over the air broadcast) content is to be used when available to decrease a cost to the user. In another example, the user may specify that a preferred level of resolution (e.g., high definition vs. standard definition) which may be used to determine which content is placed in the channel map and “where” that content is placed. A variety of other examples are also contemplated.

For example content may be organized into particular ranges of channels in the hybrid channel map based on one or more properties (block 414). For example, rather than consider original channel number as the highest priority when forming the hybrid channel map 124, the channels available from each of the plurality of content providers 102(1)-102(M) may be grouped together in channel ranges based on one or more properties. These properties may be defined in a variety of ways, such as source of content (e.g., which content provider 102(1)-102(M)), genre (e.g., sports, news, and so on), resolution (e.g., high definition vs. standard definition), output type (e.g., streaming audio vs. video), signal strength, and so on. In this way, a variety of properties may be defined which are then used to map channels to particular ranges. A wide variety of other techniques are also contemplated to organize channels in the hybrid channel map 124.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a computing device, the method comprising:

obtaining at a client a plurality of channel maps, each describing a respective one of a plurality of content providers that are configured to provide content via channels to the client; and forming a hybrid channel map from the plurality of channel maps, said forming comprising:

determining, based on a description of one or more instances of content, that one or more instances of content from a first channel of the channels matches one or more instances of content from a second channel of the channels, the first channel being associated with a different television broadcast network than the second channel; and omitting the second channel from the hybrid channel map based on the determining.

2. A method as described in claim 1, wherein the forming is performed using one or more map formation rules, at least one of which specifies which of the plurality of channel maps is to be given priority.

3. A method as described in claim 1, wherein the forming includes:

mapping a first said channel map to corresponding channels in the hybrid channel map; and mapping channels from a second said channel map in the hybrid channel map such that when a channel in the second said channel map conflicts with a channel in the first said channel map, the channel in the second said channel map is reassigned.

4. A method as described in claim 3, wherein the channel in the second said channel map is reassigned to a next available channel in the hybrid channel map.

5. A method as described in claim 3, wherein the channel in the second said channel map is reassigned to a particular range of channels in the hybrid channel map.

6. A method as described in claim 3, wherein the channel in the second said channel map is reassigned according to one or more suggestions obtained from a respective said content provider that corresponds to the second said channel map.

7. A method as described in claim 3, wherein the channel in the second said channel map is reassigned to a channel in the hybrid channel map that is closest to the channel in the first said channel map that caused the conflict.

8. A method as described in claim 1, wherein the forming is performed using one or more map formation rules, at least one of which specifies how to map channels from the plurality of channel maps that conflict.

9. A method as described in claim 8, wherein the conflict includes an instance in which different content is provided by different said content providers for a matching channel.

10. A method as described in claim 1, wherein the different television broadcast network comprises at least one of a cable television network, a satellite television network, an over-the-air television network, or an internet television network.

11. A client stored on one or more computer-readable memory devices, the client comprising one or more modules that are executable by a computing device to:

output content from a plurality of content providers via a plurality of channels; and form a hybrid channel map from a plurality of channel maps that correspond to the plurality of content providers such that, based on a genre of content provided for a particular channel of the plurality of channels by one of said content providers, a particular said channel map of the one of said content providers is given priority in the hybrid channel map to retain one or more original channel numbers over another said channel map of another of said content providers.

12. A client as described in claim 11, wherein:

at least one of said content providers provides respective said content via an Internet connection; and another of said content providers provides respective said content via a wireless broadcast.

13. A client as described in claim 11, wherein the content is television content.

14. A client as described in claim 11, wherein:

content available to be output from a respective one of said content providers is provided via a particular communication technique; and the channel map of the respective one of said content providers is not obtained using the particular communication technique.

15. One or more computer readable media devices comprising instructions that are executable to:

compare attributes of content available via channels from a plurality of content providers, the attributes including genres of the content; and form a hybrid channel map based comparing the attributes such that one or more channels of at least one of the plurality of content providers is given priority over one or more channels of another of the plurality of content providers based at least in part on a genre of the content for the one or more channels of the at least one of the plurality of content providers.

16. One or more computer readable media devices as described in claim 15, wherein the attributes includes service identifiers.

17. One or more computer readable media devices as described in claim 15, wherein the attributes includes a description of a respective network.

18. One or more computer readable media devices as described in claim 15, wherein at least one said attribute specifies that a particular said channel in a particular channel map of a particular said content provider is to be retained at a corresponding channel number.

19. One or more computer readable media devices as described in claim 15, wherein the instructions cause the hybrid channel map to be formed by taking into account a source of respective said content when a conflict is encountered between a plurality of channel maps from the plurality of content providers.

20. One or more computer readable media devices as described in claim 19, wherein the conflict involves use of a matching channel number by the plurality of channel maps.

* * * * *